_United States Patent Office_

3,419,146
Patented Dec. 31, 1968

3,419,146
SEWERAGE TREATMENT PLANT
James Koulovatos, P.O. Box 345,
Brunswick, Maine 04011
Filed Oct. 16, 1967, Ser. No. 675,660
16 Claims. (Cl. 210—138)

ABSTRACT OF THE DISCLOSURE

Sewerage treatment plant including means to aerate and comminute the effluent and means to chlorinate the then treated effluent together with means to pump the chlorinated effluent through a filter before its discharge from the plant and periodically to utilize the chlorinated effluent to backwash the filter and to deliver the backwash to the first means.

---

Figure 1:
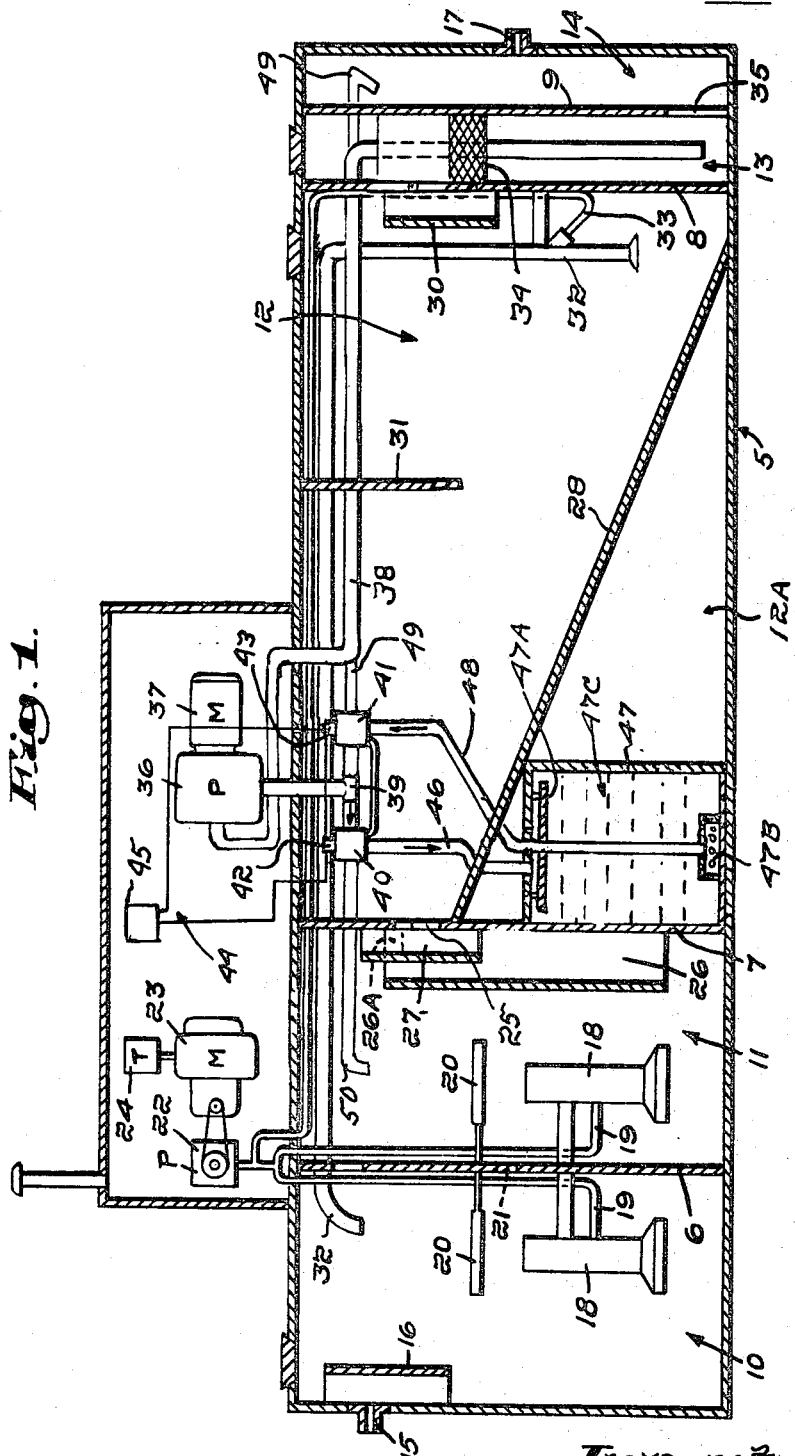

The present invention relates to sewerage treatment plants and particularly to such plants for servicing effluent from single families as well as multiple sources that are too few for treatment plants of the type presently servicing the sewerage systems of municipalities.

Sewerage disposal is a problem that is receiving more and more attention because of its relation to water pollution. Municipal sewerage treatment plants, while increasing in number, are not adapted for use except when a substantial number of sewerage sources can be combined. On the other hand, septic tanks, while being satisfactory in many cases, are objectionable when their output enters water courses.

In order for the output of any sewerage treatment plant to be suitable for discharge into other water, it must be substantially free of solids and free of harmful bacteria. It is the principal objective of the present invention to provide sewerage treatment plants that meet both of these broadly indicated requirements.

In accordance with the invention, these objectives are met with a sewerage treatment plant in which the entering effluent is comminuted and aerated and with sludge, settling in its settling chamber, recirculated for further treatment and with the outflow from the settling chamber chlorinated in a chamber. The chlorinated effluent is pumped through a filter and the flow is periodically reversed with the backwash returned to be again so passed through the plant as to be further processed and again chlorinated. The backwash is utilized to control fungus growth but is itself so controlled as not to interfere with the bacterial breakdown of the effluent.

A particular objective is to utilize a plant in which comminution and aeration is effected in two stages with the principal bacteria attack on the effluent occurring in the second stage and with the backwash from the filter delivered for second stage treatment when the amount of free chlorine is effective to eliminate fungus growth as a troublesome factor. In the second stage, the bacteria, necessary for effluent treatment, are so plentiful that the chlorine introduced in the backwash interval has no important effect thereon.

Another particular objective of the invention is to deliver the discharge from the filter, except during the backwash, back into a chamber which may be the outlet chamber and with which the chlorination chamber is in direct and continuous communication so that, in effect, the chlorinated effluent is recirculated through the filter.

Yet another objective of the invention is to utilize the discharge from the filter, except during the backwash, to assist in the break up and dilution of detergents on the surface of the last named or outlet chamber.

In the accompanying drawings, there is shown an illustrative embodiment of the invention from which these and other of its objectives, novel features, and advantages will be readily apparent.

Figure 2:
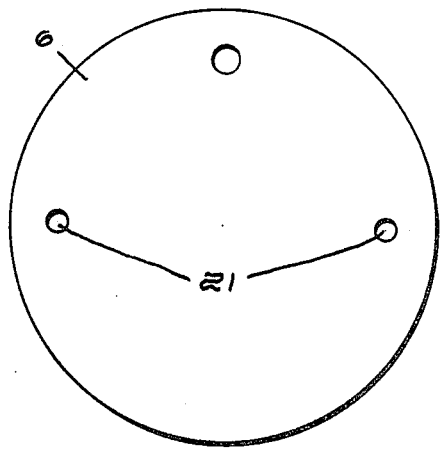
Figure 3:
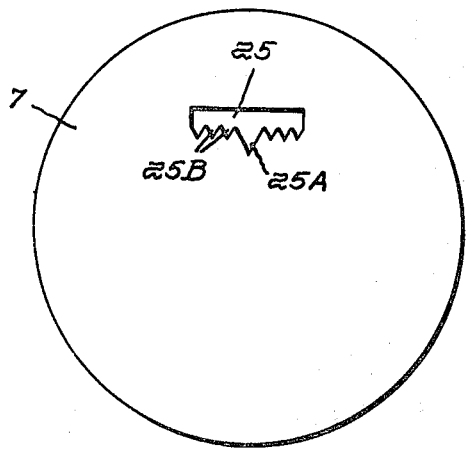
Figure 4:
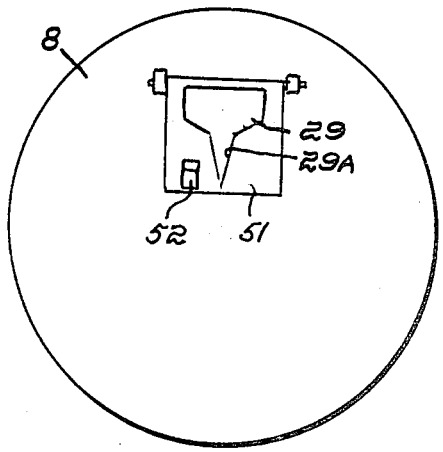
Figure 5:
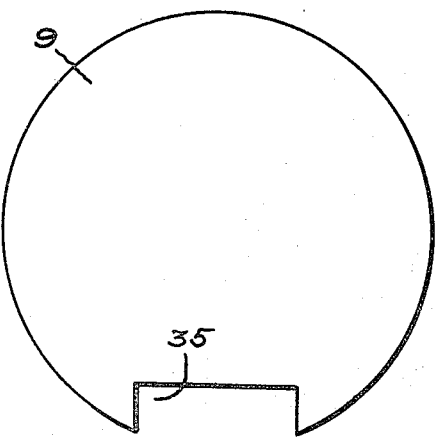

In the drawings:

FIGURE 1 is a vertical section taken lengthwise of a tank subdivided to provide the several chambers of a sewerage treatment plant in accordance with the invention, FIGURE 2 is a face view of the partition between the two comminuting and aerating chambers, FIGURE 3 is a face view of the partition between the second comminuting and aerating chambers and the settling chamber, FIGURE 4 is a like view of the partition between the settling chamber and the chlorinating chamber, and FIGURE 5 is a like view of the partition between the chlorinating and outlet chambers.

In the embodiment of the invention illustrated by the drawings, a cylindrical tank, generally indicated at 5, is divided by transverse vertical partitions 6, 7, 8, and 9 to provide generally indicated sections or chambers 10, 11, 12, 13, and 14. An inlet 15 having a baffle 16 opens into the upper part of the chamber 10 through an end wall of the tank 5 and the chamber 14 has an outlet 17 in the other end wall of the tank 5.

The chamber 10 is sometimes herein referred to as the comminuting chamber and the chamber 11 is sometimes referred to as the aerating chamber. Each of the chambers 10 and 11, however, is provided with means to aerate and circulate its contents, each such means being shown as a venturi circulator in the form of a vertical tube 18 with air supplied thereto by a conduit 19. The tubes 18 are mounted on opposite sides of the partition 6 and above the outlet end of each tube 18 there is a plate 20 to assist in the breakup of any circulated solids. Above the plates 20, the partition 6 is provided with a pair of ports 21 substantially in transverse alignment with its center. The air conduits 19 are connected to the outlet of an air pump 22 driven by the motor 23 operated at predetermined intervals as by the timer 24, for fifteen minutes each hour, by way of example.

The partition 7 has a port 25 above the ports 21 and shown as a transverse slot having a central V-shaped notch 25A substantially deeper than the V-shaped notches 25B at each side of it, an arrangement that minimizes the effects of surging in the event the tank receives an overload. A vertical channel 26 having marginal recesses 26A is secured to the infeed side of the partition 7. Within the channel 26 and spaced therefrom is a baffle 27 for the port 25. With this arrangement, aerated and partly treated effluent flows downwardly into the channel 26 and since it must flow upwardly in back of the baffle 27 to flow through the port 25, heavier particles settle out and are recirculated in the chamber 11 for further treatment, the lower end of the channel 26 being located adjacent the infeed end of the tube 18 in that chamber.

A partition 28 extends downwardly and rearwardly in the chamber 12 and joins the bottom of the tank adjacent the partition 8. The partition 28 thus establishes a closed chamber 12A and the chamber 12 is hereinafter referred to as the settling chamber. The partition 8 has an outlet port 29, shielded by a baffle 30, and shown as having its bottom edge inwardly inclined and provided with a relatively narrow and deep central V-shaped notch 29A that functions to accommodate overloads. In addition, the chamber 12 has an intermediate, depending transverse, baffle plate 31.

To ensure effective breakdown of the effluent, the contents of the settling chamber that are in the sump portion thereof are recirculated by pumping them for further treatment. Such recirculation is shown as effected by means of an air lift or venturi pump consisting of a conduit 32 having its intake end in the lower part of the chamber 12 adjacent the partition 8 and supported thereby. The conduit 32 extends forwardly through the upper part of the tank 5 with its discharge end opening into the upper part of the chamber 10. Air from the pump 22 is delivered into the conduit 32 adjacent its intake end by an air line 33, recirculation being effected at intervals, the intervals being determined by the timer 24, for example.

The chamber 13 has a tray 34 below the port 29 for chlorine tablets such as D.A.S. #559 tablets made by the Diamond Alkali Corp. of Painesville, Ohio. The chamber 13 is herein sometimes referred to as the chlorine treatment or chlorine detention chamber and its outlet is a cutout 35 in the bottom of the partition 9 through which the treated effluent flows into the outlet chamber 14.

In accordance with the invention, chlorinated effluent is continuously pumped from the lower part of the chamber 13. To this end, a pump 36, driven by the motor 37, has its inlet connected to the inlet conduit 38 and its outlet connected to a T 39 provided with valves 40 and 41, each of the type having a first position and a second position, the second positions being established when the solenoids 42 and 43, respectively, are energized, the solenoids being arranged in series in a circuit 44 controlled by the timer 45.

In the first position of the valve 40, the T 39 is connected to the conduit 46 in communication with the upper end of a filter generally indicated at 47 and in the first position of the valve 41, the conduit 48, in communication with the lower end of the filter 47, is connected to a conduit 49 extending into the chamber 14 and desirably directed against the partition 9 to assist as a detergent dilutor.

When the solenoids 42 and 43 are energized by the timer 45, the valves 40 and 41 are so positioned that the T 39 is placed in communication with the conduit 48 and the conduit 46 is placed in communication with the conduit 50 thereby to reverse the flow through the filter 47 and to deliver the backwash through the conduit 50 which discharges into the chamber 11.

The sand filter 47 shown in the drawings has proved satisfactory in use. The filter 47 contains a spreader 47A below the conduit 46 and the conduit 48 extends downwardly and opens into the ported chamber 47B. The filtering material is indicated at 47C and consists of a plurality of layers, six, for example, with the top layer spaced from the spreader 47A and increasing as to particle size from #60 sand to 1½ inch rock.

The use of the ports, such as the ports 25 and 29 to facilitate the handling of overloads, is desirable in many cases. The port 29 may be a hinged flap 51 yieldably held shut as by a weight 52.

From the foregoing, it will be appreciated that apparatus in accordance with the invention provides for the effective continuous treatment of sewerage with the effluent being first subjected to comminuting and aeration treatments and then discharged into the settling chamber 12 with the heavier components recirculated for repetition of the previous treatment. During such previous treatment, bacterial attack on the effluent is most effective in the chamber 11 although some of the effluent in the chamber 10 is also exposed to bacterial treatment.

The discharge from the tank 5 would be objectionable for most areas without chlorination to render the discharged effluent sufficiently free of bacteria to warrant discharge to other waters without further treatment. While the passage of the effluent through a chamber wherein chlorination occurs is helpful, it is essential that the chlorinated effluent be filtered and that the filter be maintained effective by providing reverse flushing. The liquid stream attendant reverse flushing is delivered periodically to aeration areas, desirably the chamber 11 where the chlorinated liquid is effective to inhibit fungus development without interference with the desired attack on the effluent by the bacteria. It will be appreciated that the effluent is chlorinated for a sufficient length of time to meet legal requirements.

I claim:

1. A sewerage treatment plant comprising means to comminute and aerate the effluent, means for feeding material to be treated into said plant, a settling chamber in communication with said first named means and receiving therefrom aerated and comminuted effluent, pumping means in communication with the lower part of said settling chamber and said first named means to return for further comminuting and aerating treatment particles settling out in said settling chamber, chlorinating means in communication with the upper part of said settling chamber and receiving effluent therefrom, a filter, means for removing treated effluent from said plant, and means in communication with said chlorinating means and including discharge and backwash conduits and operable to pass chlorinated effluent through said filter in one direction and through said discharge conduit, and, alternatively, through said filter in the opposite direction and through said backwash conduit, said backwash conduit having its outlet end in communication with said first named means and said discharge conduit having its outlet end in communication with said effluent removing means.

2. The sewerage treatment plant of claim 1 and an outlet chamber in communication with and receiving effluent directly from the chlorinating means, the outlet chamber having an outlet port, and the discharge conduit discharges into the outlet chamber above the outlet port to effect detergent separation and dilution.

3. The sewerage treatment plant of claim 1 in which the comminuting and aerating means include first and second stages, the discharge of the backwash conduit being in the second stage.

4. The sewerage treatment plant of claim 3 in which the pumping means is in communication with the first stage.

5. The sewerage treatment plant of claim 1 in which the outlet end of the discharge conduit is within the plant and downstream of the settling chamber.

6. The sewerage treatment plant of claim 1 in which the outlet end of the discharge conduit is within the plant and downstream of the chlorinating means.

7. A sewerage treatment plant comprising an elongated tank divided into five chambers, the first chamber including an inlet and the fifth chamber including an outlet, said chambers being in downstream communication, each with the next following section, means in both of the first two chambers to aerate and agitate the contents thereof, the third chamber being a settling chamber, sludge pumping means having its inlet in communication with the third chamber and its outlet in communication with the first chamber, means to chlorinate the contents of the fourth chamber, a filter, and means to circulate the fourth chamber contents through the filter in one direction and into the fifth chamber and through the filter in the opposite direction and into the second chamber to backwash said filter, said circulating means including a pump with its inlet in communication with the interior of the fourth chamber, and valve means operable to effect either circulation.

8. The sewerage treatment plant of claim 7 in which the settling chamber has a partition downwardly inclined towards the fourth section and defining a sixth chamber, the filter being located in the sixth chamber.

9. The sewerage treatment plant of claim 7 and baffle means between the second and third chambers providing a downward and then upward flow of the effluent between the second and third chambers thereby to separate out the heavier particles, the baffle means including a downward passage opening adjacent the aerating and agitating means of the second chamber.

10. The sewerage treatment plant of claim 7 in which the means to chlorinate the fourth chamber contents includes a basket for chlorine tablets in the path of the effluent flowing from the third to the fourth chamber.

11. The sewerage treatment plant of claim 10 in which the fourth and fifth chambers are in communication at the bottom thereof.

12. The sewerage treatment plant of claim 7 in which the pump of the circulating means is continuously running and the valve means normally effect discharge of the filtered and chlorinated effluent into the fifth section, and timing means periodically operate said valve means to effect the other circulation on a predetermined interval.

13. The sewerage treatment plant of claim 7 in which the communication between the second chamber and the settling chamber is in the form of a transverse slot having, in its bottom margin, a central V-shaped recess and marginal V-shaped recesses, the central recess being deeper than the marginal recesses.

14. The sewerage treatment plant of claim 7 in which the communication between the settling chamber and the chlorinating chamber is in the form of a transverse slot having its bottom margin downwardly and inwardly inclined and a central, relatively narrow and deep V-shaped recess.

15. The sewerage treatment plant of claim 7 including a hinged gate and weight means yieldably holding the gate in its closed position and the communication between two of the chambers is a port in the gate.

16. The sewerage treatment plant of claim 15 in which the port is a transverse slot having a recess in its bottom edge.

References Cited

UNITED STATES PATENTS 3,306,447   2/1967   Medeiros _____ 210—220 X

REUBEN FRIEDMAN, *Primary Examiner.*

J. L. DE CESARE, *Assistant Examiner.*

U.S. Cl. X.R.

210—152, 195, 199, 202, 220, 295